June 9, 1964 W. H. CULVER 3,136,959
OPTICAL MASER

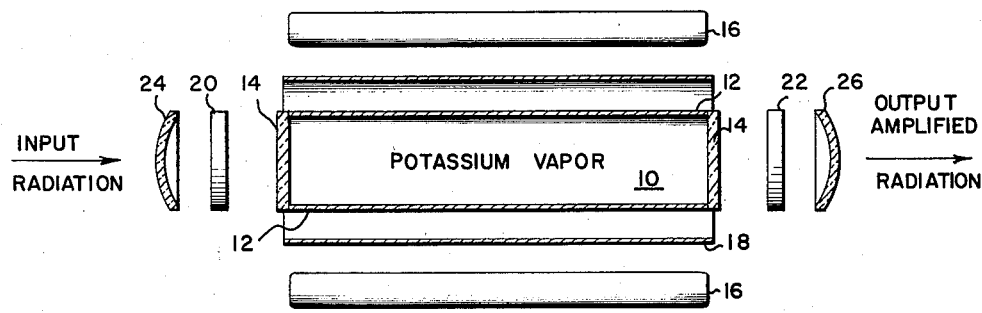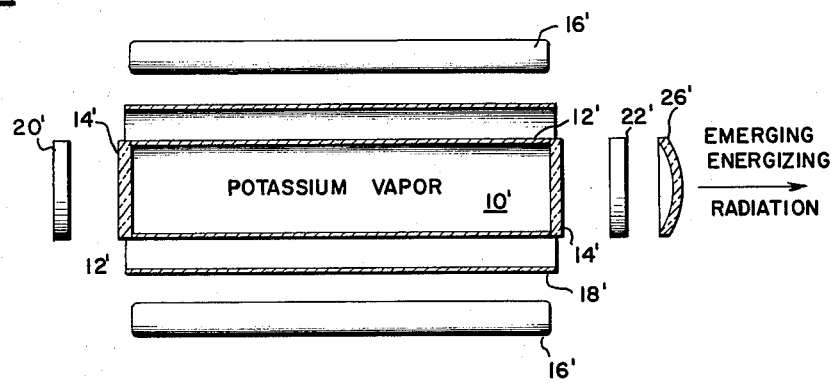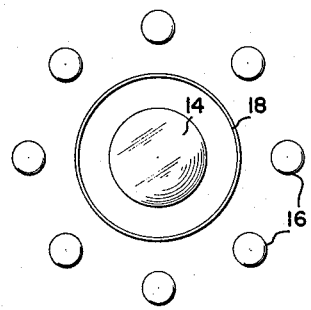

Filed Aug. 12, 1960 3 Sheets-Sheet 2

INVENTOR
WILLIAM H. CULVER

BY *Stowell & Stowell*

ATTORNEYS

June 9, 1964 — W. H. CULVER — 3,136,959
OPTICAL MASER
Filed Aug. 12, 1960

INVENTOR
WILLIAM H. CULVER

BY Stowell & Stowell
ATTORNEYS

United States Patent Office 3,136,959
Patented June 9, 1964

3,136,959
OPTICAL MASER
William H. Culver, Los Angeles, Calif., assignor, by mesne assignments, to Research Corporation, New York, N.Y., a corporation of New York
Filed Aug. 12, 1960, Ser. No. 49,233
3 Claims. (Cl. 331—94.5)

The present invention relates to apparatus for amplifying and producing electromagnetic energy directly from radiative transitions in excited molecules or atoms; or electrons or groups of electrons in paramagnetic or ferromagnetic media and nuclei.

Recent developments in the field of the production of electromagnetic energy have provided a family of new devices for generating coherent radiation in the infrared, visible and ultraviolet frequency bands, all of which will be generically designated herein as "optical" radiation. Heretofore, the operation of these devices, which have been referred to as "masers," has largely been confined to the microwave region of the energy spectrum. They have been used principally as low noise amplifiers and ultra-stable oscillators or clocks. Optical masers have been considered to be too noisy to employ as a low noise amplifier, except in very special circumstances, but it is believed that they will have a wide range of application as coherent radiation sources.

Among the more immediate uses for optical type masers are: laboratory light sources that can create much higher densities of radiation than have ever been achieved; communication over greater distances, especially in outer space; and active radar. There is also a possibility of their eventual use as a means of destroying objects at a distance by focussing a large amount of energy on a small area.

In a maser device presently known, a beam of gas molecules in an excited state, where the upper state or states are more populated proportionately than the lower state or states, is supplied continuously to a high Q resonant cavity. Transitions are induced in the cavity resulting in a change in cavity power level when the beam of molecules is present. If the power from the beam is enough to maintain the field strength in the cavity at a sufficiently high level to induce transitions in the following beam molecules, then self-sustained oscillations will result. Although the power so produced is at a very low level, it is produced directly and entirely by molecular activity, and it has been demonstrated that it can be maintained at an extraordinary frequency stability in the order of 1 part in $10^{10}$ or better. If fewer molecules are present than are necessary to maintain oscillation, then by supplying a signal from an external radio-frequency oscillator of the same frequency, further oscillations of this frequency can be triggered in the same way by the signal, and thus the device will function as an amplifier of microwave oscillations.

The frequency will be essentially determined by the atomic or molecular resonant frequency, but may be varied by the Zeeman or the Stark effect, i.e., by applying a magnetic or an electric field. Some frequency variation may also be obtained by tuning the chamber. The radiation is essentially monochromatic.

Among the more promising forms of masers known is one which employs as the negative temperature medium a material whose energy level system is characterized by at least three energy levels, with the separations of these three energy levels falling within desired operating frequency ranges. To this material, there is supplied pumping power which effects transitions from the lowest to the highest of the selected three energy levels. By power saturation of the highest energy level, whereby the populations of the highest and lowest energy levels tend to be equalized, there is established in one of these two energy levels a nonequilibrium population distribution with respect to the intermediate energy level of the selected three, whereby a negative temperature or an inverted population distribution results in the material. Thereafter a signal of appropriate frequency can be amplified by being applied thereto in a manner such that the emission of radiation is stimulated therefrom.

It is to be noted that the process of relaxation from randomly overpopulated states may give rise to spontaneous emission, that is, emission caused by radiative transitions in a mode other than the desired or stimulated one.

The present invention has for its principal object the reduction of the number of modes of oscillation of the high Q resonant chamber of the type of apparatus described above.

The object of the present invention is achieved by disposing patterns of different reflectivity on the walls of the resonant chamber of the device in such a manner as to cause one of the modes of oscillation of the chamber to have a substantially higher Q than the other modes and thereby effectively producing coherent radiation therefrom. Coherent radiation as referred to in the description means radiation in which definite phase relationships exist between radiation considered at differing points in the cross section of the radiant energy beam.

The principles of the invention, as well as other objects and advantages thereof, will clearly appear from a description of a preferred embodiment as shown in the accompanying drawings, in which:

FIG. 1 is a schematic view, partly in section, of one embodiment of the invention used as an amplifier;

FIG. 2 is an end view of the embodiment illustrated in FIG. 1;

FIG. 3 is a schematic view, partly in section, of another embodiment of the invention used as an oscillator;

FIGS. 1 and 2 show in schematic form the essentials of a practical embodiment of the invention as an amplifier using potassium vapor as an active material. Other materials which may be employed with satisfactory results include cesium vapor, mercury vapor, and helium.

Figure 4:
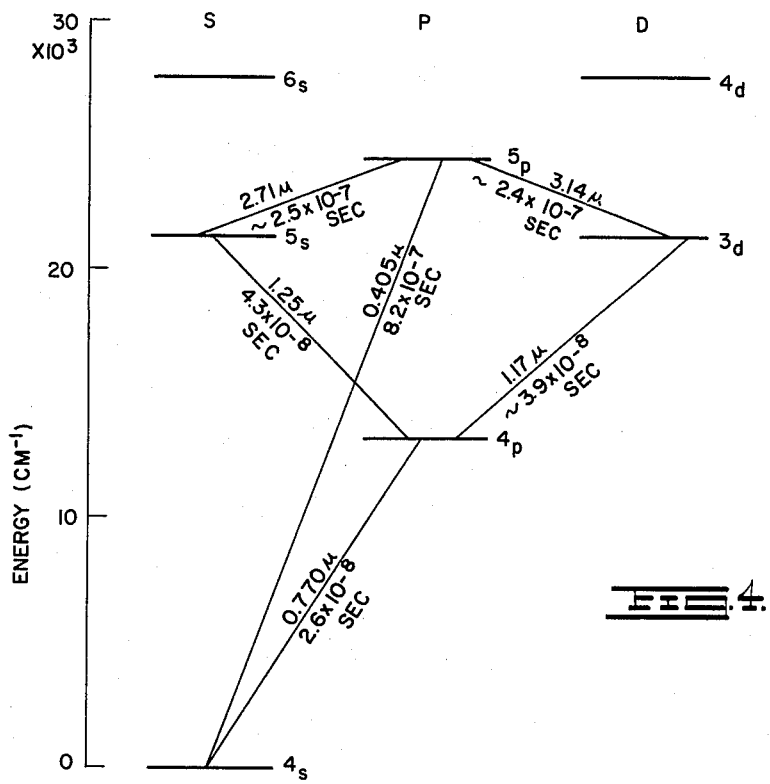
FIG. 4 is a graphic illustration of the energy levels of atomic potassium.

The upper energy states involved in the transitions are normally not populated at all at ordinary temperatures. In such cases, it is not sufficient only to separate the atoms or molecules in the upper state from those in the lower state as is done in an ammonia microwave maser; a nonequilibrium population in the excited states must be created by some process which supplies energy to the atoms or molecules. In the case of potassium vapor, one manner of accomplishing this end is by an "optical pumping" method as will be explained in greater detail hereinafter.

The specific illustrative embodiment of the present invention comprises a maser including a chamber having reflective and parallel plates and side walls. Positioned within the chamber is an active material, which is pumped by an energy source disposed about the chamber. The side walls are transparent to the pumping energy and either absorptive of other energy radiated thereto or provided with suitable filter means to filter out undesired energy. A patterned reflector is arranged adjacent each of the end plates of the chamber for reducing the number of modes of oscillation of the resonant chamber.

Referring now to FIG. 1, the apparatus of the invention comprises a cell or chamber 10 having a cylindrical side wall 12 and end plates 14 for containing an active material such as potassium vapor. Typically, the chamber 10 may be about one centimeter in diameter and ten centimeters in length.

A plurality of potassium vapor lamps 16 is disposed about the chamber 10 so that the radiation emitted therefrom will penetrate the transparent walls of the cell to activate the material therein. The lamps 16 are employed as a source of pumping energy and may be energized by any suitable source. A filter element 18 is provided about the chamber 10 to filter out any undesired radiation, such as infrared radiation, and thereby prevent the entry thereof into the interior of the chamber 10.

The side wall 12 is of a material which is transparent to the pumping energy and the filter element 18 is also transparent thereto. However, the filter element 18 is absorptive or reflective of other radiation impinging thereon, whereby both the side wall 14 and the filter 18 allow the active material within the chamber 10 to be energized by pumping radiation and also exclude from the chamber undesired radiation.

At both ends of the cell 10 there is disposed a reflector 20, 22. These plates are spaced apart an integral number of half wavelengths of an optical radiation frequency characteristic of an energy level transition in the gas contained in the cell 10. The reflectors 20, 22 are provided with reflecting surfaces with selectively reflecting patterns thereon as will be explained in greater detail hereinafter. A lens 24 is disposed in the path of the incoming beam of optical radiation and a lens 26 is disposed in the path of the output beam. The lenses 24 and 26 are part of the optical system and are effective to suitably direct and focus the input and output beams of radiation.

With reference to FIG. 3, there is shown in schematic form the essentials of a practical embodiment of the invention as an oscillator including components which are generally similar to those of the amplifier illustrated in FIGS. 1 and 2. The components of the oscillator are the same as the amplifier and are designated with prime reference numerals with the exception that no element corresponding to lens 24 is employed. Also, the plate 20' need not have an aperture or be otherwise transparent to an input beam as is necessary in the case of the plate 20 of the amplifier. In all other respects the components are similar.

The process of oscillation within the apparatus depends on the selective generation within the chamber 10 of a component of energy spontaneously emitted by the active material therein.

As mentioned hereinabove, the non-equilibrium or inverted population of atoms or molecules in the excited states may be created by providing means for transferring energy to the atoms or molecules. In this embodiment the method referred to as "optical pumping" is employed. To more completely understand the phenomena which occurs reference is had to FIG. 4, which shows the energy level scheme for a potassium atom. Normally, all of the potassium atoms within the cell 10 are in the lowest or "ground" energy state, the $4s$ state. Violet light of 0.405 micron wavelength from the potassium vapor lamps 16 is caused to impinge on the potassium vapor within the cell 10 and thereby will "pump" some of the atoms into the $5p$ state from which they will decay either to the $5s$, the $3d$, or back to the $4s$ state giving off energy in the form of radiation of 2.71, 3.14, and .405 microns wavelength, respectively. The atoms that decay to the $5s$ and the $3d$ states decay with very short lifetime to the $4p$ state and then on to the $4s$ state.

The decay from the $5s$ and the $3d$ states is so rapid that a greater population is maintained thereby in the $5p$ state than in the $5s$ or the $3d$ state. By achieving such an objective, the device can be made to oscillate as a maser at 2.71 microns or 3.14 microns, respectively.

The modes of oscillation of a chamber resonant in the optical band of electromagnetic radiation are considerably different from the modes usually considered for microwave cavities. The modes of highest Q can be represented as waves that reflect back and forth between the plates 20, 22 at such an angle that the distance along the wave propagation from one plate to the other and back to the first plate is a whole number of wavelengths of the wave. Thus, the wave interferes constructively with itself at each reflection; that is, it is in the form of a standing wave.

Figure 5:
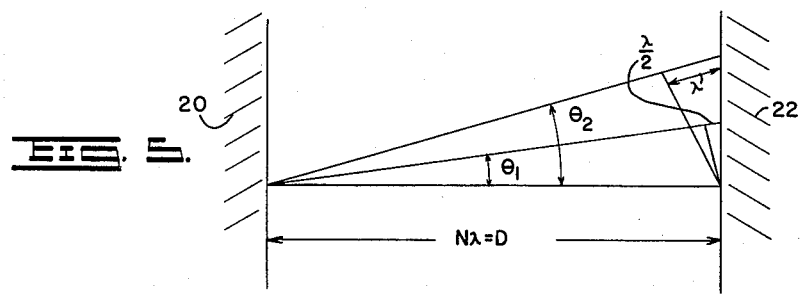
FIG. 5 is a graphic illustration of the propagation directions of the modes of oscillation in a resonant chamber of the invention.

If the distance between the plates is exactly N wavelengths, then one mode of oscillation is comprised of a wave that reflects back and forth between the reflector plates 20, 22 with a propagation direction which is perpendicular to the plates. Other modes of oscillation comprise waves which propagate at an angle $$\theta = \sqrt{\frac{\lambda}{2D}}$$

from the perpendicular; where $\lambda$ is the wavelength of the radiation, and $D$ is the distance between the plates. These are the directions which give constructive interference as diagrammatically illustrated in FIG. 5. The objective of the invention is to restrict the oscillation of the resonant chamber 10 to the mode which reflects back and forth perpendicular to the plates 20, 22. This objective is achieved by introducing greater attenuation into all the modes other than the "perpendicular" mode by causing them to have a lower "Q."

Figure 6:
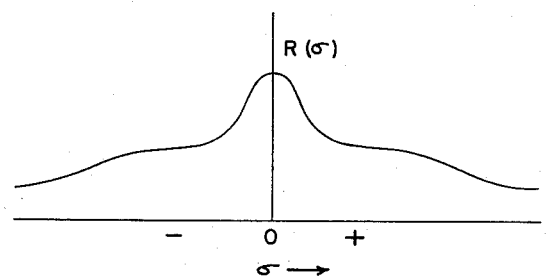
FIG. 6 is a graph of an autocorrelation function.
Figure 7A:
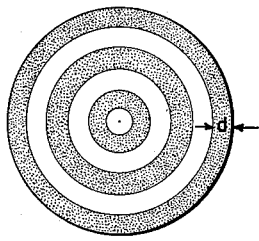
FIGS. 7a through 7i show various possible patterns of different reflectivity which may be employed on the surfaces of the plates of the resonant chamber in order to achieve the objectives of the invention.
Figure 7B:
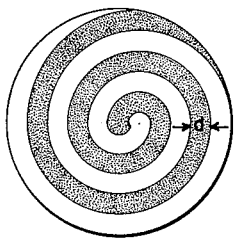
Figure 7C:
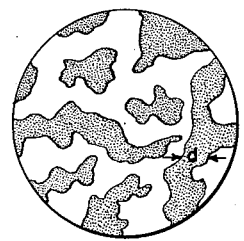
Figure 7D:
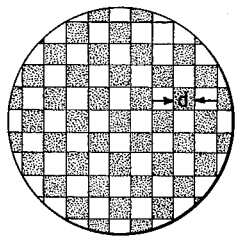
Figure 7E:
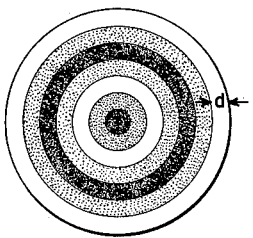
Figure 7F:
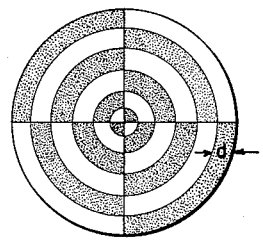
Figure 7G:
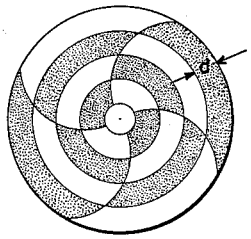
Figure 7H:
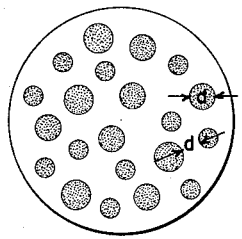
Figure 7I:
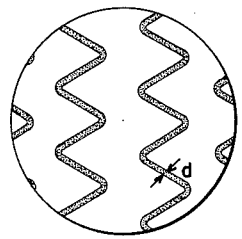

When one of the reflecting plates 20 or 22 has a pattern of different reflectivity on its surface intsead of a usual uniform surface, radiation in the "perpendicular" mode will on successive reflections, always reflect from the same portion of the plate being considered. Energy in this mode will decay at a slower rate than energy in a mode where radiation reflects successively from points of different reflectivity. The reason for the difference in the decay rates can be shown by a property of an autocorrelation function. The autocorrelation function $R(\sigma)$ of some function $f(x)$ is given by $$R(\sigma) = [f(x) + f(x+\sigma)]$$

where the brackets [ ] mean to take the average value of the bracketed quantity, that is, to average over all values of $x$. The autocorrelation function is a maximum at $\sigma=0$, where it is equal to the average value of $(f(x))^2$. For properly chosen functions $f(x)$, the autocorrelation function decreases monotonically as $\sigma$ departs from zero as shown in the graph of FIG. 6.

Higher order correlation functions, such as the $n^{\text{th}}$ order correlation function given by $$R_n(\sigma) = [f(x)f(x+1) \ldots f(x+(n-1)\sigma)]$$

have an even sharper maximum at $\sigma=0$.

The radiation in the "perpendicular" mode is attenuated on each reflection by different amounts at different portions of the beam depending upon which part of the plate the beam is reflected from. The reflectivity is a function of two coordinates, $f(x, y)$. The portion of radiation remaining in the "perpendicular" mode after $n$ reflections from the non-uniform plate will be $$[(f(x, y))^n]$$

where the averaging is over both $x$ and $y$ (i.e., over the entire two dimensional surfaces of the reflecting plate). Radiation propagating at some angle to the "perpendicular" mode will decay as $$R_n(\theta, \phi) = [f(x, y) + f(x+\theta, y+\phi) \ldots$$
$$f(x+(n-1)\theta, y+(n-1)\phi)]$$

Here $\theta$ and $\phi$ are proportional to the angular deviation away from the perpendicular in the $x$ and $y$ directions, respectively.

For properly chosen functions $f(x, y)$, reflectivity distributions $R(\theta, \phi)$ will have a very steep maximum at $\theta=\phi=0$. That is, the loss rate of radiation from the mode propagating perpendicular to the reflecting plates will be much less than for other modes.

The mode selection will be enhanced by having reflectivity patterns on both plates 20, 22. They may be identical with one another or different from one another, preferably identical. The reflectivity need not differ greatly over the patterns of the reflecting surfaces of the plates 20, 22. For example, it may vary from .98 to .99 or less.

A number of typical reflectivity patterns is shown in FIGS. 7a–7i; the optimum pattern will be a function of the particular characteristics desired.

An important feature of the patterns is that the reflectivity be different in different parts of the surface and the typical distance across a fairly uniform area be of the prescribed order of magnitude.

It will be understood that the portions of the patterns illustrated in FIGS. 7a–7i which are shaded may be considered as the regions of relatively low reflectivity, while those which are not shaded are the regions of high reflectivity. The size or width of the various reflecting regions which is identified as "$d$" in the drawing must be such that $$d > \sqrt{\lambda D}$$

where $D$ is the distance between the plates 20, 22 and $\lambda$ is the wavelength of the light. That is, in order for the geometric optics discussed hereinabove to hold, the structure size must be less than $\sqrt{n\lambda D}$, where $n$ is the number of reflections required to decrease the intensity of the beam to a very low value. However, it may be desirable that a few of the elements on the reflecting plates be smaller than $d$, in order that some of the radiation cannot be considered as traveling in rays as described. Light reflecting from these smaller elements will be defracted into a larger solid angle than the light reflected from the larger elements and will diffuse over a large portion of the surface, thus coupling the radiation field together and assuring that it all radiate in the same phase.

In order that the function $R(\theta, \phi)$ have a sharp maximum at $\theta=\phi=0$, i.e., in order to satisfy the requirements for mode suppression, it is necessary that the pattern structure not be too large.

In order for the Q of the mode adjacent the "perpendicular" mode to be greatly reduced the following must be satisfied $$d < n\sqrt{\frac{\lambda D}{2}}$$

The optimum size for the structure is of the order of a few times $\sqrt{\lambda D}$. Typical values for the above variables might be, $D = 10$ cm.
$n = 100$
$\lambda = 5 \times 10^{-5}$ cm.
$d = 0.5$ cm.

It will be appreciated from the foregoing description that the present invention will effectively cause the device to oscillate in only one mode. In the event the distance between the plates 20, 22 changes slightly due to heating or some other cause, the device will tend to radiate coherent energy in the same direction but at a different frequency. It is, therefore, advantageous to provide means (not shown in the drawing) for adjusting the spacing of plates 20, 22 by moving one or both plates. Such adjusting means not only makes it possible to maintain the frequency of the output radiation more nearly constant but, since the effect of change of spacing on frequency is greater and the effect on the direction is less than with a laser without patterned reflector elements on the plates, it makes it possible to effect variations in the frequency of the output radiation with a minimum of effect on the direction.

If a device embodying the principles of the invention were constructed to put out one watt of 5000 angstrom (green) light in a plane wave from an aperture one centimeter in diameter, the bandwidth of this radiation might be of the order of $10^3$ cycles per second out of $6 \times 10^{14}$. The angular divergence of the output beam will be limited only by the size of the aperture and, in the case above, it will radiate into only $\frac{1}{4} \times 10^{-8}$ steradians of solid angle of an isotropic radiator that radiates $4 \times 4 \times 10^8$ watts from a sphere one centimeter in diameter.

With a device of the characteristics described above, as much energy can be aimed on a target from a distance of 100 km. as it receives from the sun in a 1 angstrom band at 5000 angstroms. Thus, if a one angstrom or smaller band is used in the optics, active radar at these distances becomes a possibility. With short time stability of the order of one part in $10^{12}$, Doppler measurements of velocity to $10^{-2}$ cm./sec. are possible.

At the distance of the moon the radiation will appear to the naked eye to be about $\frac{1}{20}$ of the brightness of the moon. It should be possible to communicate over interplanetary distances with only a few watts of radiated power.

The accompanying table tabulates some light maser (laser) possibilities.

Power = 1 watt (power density, $J=1$ watt/cm.² at source)
$\lambda = 5000$ A. ($\eta = 6 \times 10^{+14}$)
Aperture ($a$) = 1 cm. diameter

| Distance, $D$ | Target spot dia., $d$ | (On target) power density, $p$ | (On target) Photon density |
|---|---|---|---|
| 10 cm | $5 \times 10^{-4}$ cm | $4 \times 10^6$ watts/cm.² | $10^{25}$ sec.⁻¹ cm.⁻² |
| 1 km | 5 cm | $4 \times 10^{-2}$ watts/cm.² | $10^{17}$ sec.⁻¹ cm.⁻² |
| 100 km | 5 m | $4 \times 10^{-6}$* | $10^{13}$ sec.⁻¹ cm.⁻² |
| $5 \times 10^5$ km. (Moon) | 25 km | $1.6 \times 10^{-13}$** | $4 \times 10^5$ sec.⁻¹ cm.⁻¹ |
| $10^8$ km. (Sun) | $5 \times 10^3$ km | $4 \times 10^{-18}$ | 10 sec.⁻¹ cm.⁻². |

*Same as Sun in 1 ang. band.
**Mars in 100 ang. band

NOTE.—$p = Ja^4/\lambda^2 D^2$. Thus much greater power densities on a distant spot are theoretically possible by increasing the aperture, $a$. For the Laser example above in a ranging system using a 10 cm. dia. collection optics at a detector, a target that has a 1 m.² cross section and scatters isotropically will return $10^5$ photons per second to the detector from a distance of 100 km.

In accordance with the provisions of the patent statutes, I have explained the principles and mode of operation of my invention and have illustrated and described what I now consider to represent its best embodiments. However, I desire to have it understood that, within the scope of the appended claims, the invention may be practiced otherwise than as specifically illustrated and described.

I claim:

1. Apparatus for obtaining stimulated coherent electromagnetic energy in the optical band of frequencies comprising a resonant cavity having opposing end walls, means supplying to said cavity an ensemble of oscillating particles having an inverted population distribution between at least two different energy states capable of radiating energy of a frequency related to the difference in energy between said energy states, said resonant cavity being of high Q at said frequency, and a plurality of patterned reflector elements having zones of different reflectivity of a width substantially greater than the square root of the product of the distance between said end walls and the wavelengths of the radiated energy and positioned in the path of propagation of said energy to provide a high reflectivity for a selected mode of propagation of said energy.

2. Apparatus for obtaining stimulated coherent electromagnetic energy in the optical band of frequency comprising a resonant cavity having opposing end walls, means supplying to said cavity an ensemble of oscillating particles having an inverted population distribution in at least two different energy states capable of radiating energy of a frequency related to the difference in energy between said energy states, said resonant cavity being of high Q at said frequency, and a plurality of patterned reflector elements having zones of different reflectivity of a width substantially greater than the square root of the product of the distance between said end walls and the wavelengths of the radiated energy and positioned in the path of propagation of said energy through said end walls to provide a high reflectivity for a selected mode of propagation of said energy.

3. Apparatus for obtaining coherent electromagnetic energy in the optical band of frequencies as defined in claim 2 wherein said reflector elements are positioned adjacent and substantially parallel to said end walls.

References Cited in the file of this patent

UNITED STATES PATENTS

| 2,851,652 | Dicke | Sept. 9, 1958 |
| 2,929,922 | Schawlow et al. | Mar. 22, 1960 |

OTHER REFERENCES

Schawlow et al.: Article, Infrared and Optical Masers, Physical Review, vol. 112, No. 6, Dec. 15, 1958, pages 1940–1949.